US010713893B2

(12) United States Patent
Sanford et al.

(10) Patent No.: US 10,713,893 B2
(45) Date of Patent: Jul. 14, 2020

(54) DUAL PREPAID/LOYALTY CARD FOR GAMING

(71) Applicant: Sightline Interactive, LLC, Las Vegas, NV (US)

(72) Inventors: Kirk E. Sanford, Las Vegas, NV (US); Thomas M. Sears, Henderson, NV (US); Omer Sattar, Las Vegas, NV (US)

(73) Assignee: Sightline Interactive, LLC, Las Vegas, NV (US)

( * ) Notice: Subject to any disclaimer, the term of this patent is extended or adjusted under 35 U.S.C. 154(b) by 0 days.

(21) Appl. No.: 15/961,160

(22) Filed: Apr. 24, 2018

(65) Prior Publication Data

US 2018/0240302 A1 Aug. 23, 2018

Related U.S. Application Data

(63) Continuation of application No. 15/271,346, filed on Sep. 21, 2016, now abandoned, which is a (Continued)

(51) Int. Cl.
*G07F 17/32* (2006.01)
*G06Q 20/22* (2012.01)
(Continued)

(52) U.S. Cl.
CPC ....... *G07F 17/3251* (2013.01); *G06Q 20/227* (2013.01); *G06Q 20/349* (2013.01); *G06Q 20/387* (2013.01); *G06Q 30/0226* (2013.01); *G06Q 50/34* (2013.01); *G07F 17/3227* (2013.01); *G07F 17/3237* (2013.01); *G07F 17/3239* (2013.01); *G07F 17/3241* (2013.01); *G07F 17/3244* (2013.01); *G07F 17/3255* (2013.01)

(58) Field of Classification Search
CPC ............. G07F 17/3237; G07F 17/3255; G07F 17/3239; G07F 17/3244; G07F 17/3251; G07F 17/3227; G07F 17/3241; G06Q 20/227; G06Q 20/349; G06Q 20/387; G06Q 30/0226; G06Q 50/34
See application file for complete search history.

(56) References Cited

U.S. PATENT DOCUMENTS 5,038,022 A * 8/1991 Lucero .................. G06Q 20/04 235/375
5,811,772 A * 9/1998 Lucero .................. G06Q 20/04 235/380

(Continued)

*Primary Examiner* — David L Lewis
*Assistant Examiner* — Matthew D Hoel
(74) *Attorney, Agent, or Firm* — Ulmer & Berne LLP

(57) ABSTRACT

Systems and methods are provided for associating wagering accounts with each of a stored value account and a loyalty account. The stored value account can be associated with a prepaid card and can be useable over an open system bankcard network. The prepaid card can allow funds in the stored value account to be used at any location capable of accepting payment through the open system bankcard network such as gas stations, grocery stations, outlets, and restaurants. A player transfer funds, back and forth between the stored value account and the wagering account.

20 Claims, 5 Drawing Sheets

430
WAYS TO LOAD VALUE
- SLOT TICKETS
- JACKPOT PAYOUTS
- REDEMPTIONS (POINTS)
- CHECK CASHING
- ONLINE CREDIT/DEBIT
- CASINO CAGE
- STANDARD ACH 405 410 Loyalty SLOTS & TABLES 401 403 421 421 421 427 HARDWARE GROCERY GAS ATM RESTAURANT 423

Related U.S. Application Data continuation of application No. 14/033,492, filed on Sep. 22, 2013, now abandoned.

(60) Provisional application No. 61/744,564, filed on Sep. 28, 2012.

(51) Int. Cl.

| | |
|---|---|
| ***G06Q 20/34*** | (2012.01) |
| ***G06Q 20/38*** | (2012.01) |
| ***G06Q 30/02*** | (2012.01) |
| ***G06Q 50/34*** | (2012.01) |

(56) References Cited

U.S. PATENT DOCUMENTS

| | | | | | |
|---|---|---|---|---|---|
| 5,902,983 | A * | 5/1999 | Crevelt | G06Q 20/04 | 235/375 |
| 5,959,277 | A * | 9/1999 | Lucero | G06Q 20/04 | 235/380 |
| 6,160,256 | A * | 12/2000 | Ishihara | H01J 49/0027 | 250/282 |
| 6,347,738 | B1 * | 2/2002 | Crevelt | G06Q 20/04 | 235/375 |
| 6,394,907 | B1 * | 5/2002 | Rowe | G06Q 20/02 | 273/143 R |
| 6,620,046 | B2 * | 9/2003 | Rowe | G07F 17/32 | 463/25 |
| 6,739,972 | B2 * | 5/2004 | Flanagan-Parks | G07F 17/32 | 235/380 |
| 7,819,742 | B2 * | 10/2010 | Chamberlain | G06Q 20/10 | 463/16 |
| 2001/0054003 | A1 * | 12/2001 | Chien | G06Q 20/04 | 705/14.17 |
| 2002/0002075 | A1 * | 1/2002 | Rowe | G06Q 20/10 | 463/25 |
| 2002/0039921 | A1 * | 4/2002 | Rowe | G06Q 20/06 | 463/25 |
| 2002/0068624 | A1 * | 6/2002 | Ellis | G07F 17/32 | 463/25 |
| 2003/0004871 | A1 * | 1/2003 | Rowe | G06Q 20/10 | 705/39 |
| 2003/0211883 | A1 * | 11/2003 | Potts | G06Q 20/18 | 463/25 |
| 2006/0052153 | A1 * | 3/2006 | Vlazny | G06Q 20/06 | 463/17 |
| 2006/0205481 | A1 * | 9/2006 | Dominelli | G06Q 20/06 | 463/25 |
| 2007/0267479 | A1 * | 11/2007 | Nix | G06Q 20/10 | 235/379 |
| 2008/0113776 | A1 * | 5/2008 | Sommer | G07F 17/32 | 463/25 |
| 2009/0029763 | A1 * | 1/2009 | Schwartz | G07F 17/32 | 463/25 |
| 2009/0186701 | A1 * | 7/2009 | Rowe | G06Q 20/10 | 463/42 |
| 2010/0222132 | A1 * | 9/2010 | Sanford | G06Q 30/02 | 463/25 |
| 2012/0142403 | A1 * | 6/2012 | Prather | G06Q 20/10 | 463/13 |

* cited by examiner

DUAL PREPAID/LOYALTY CARD FOR GAMING

CROSS-REFERENCE TO RELATED APPLICATIONS

This application is a continuation of U.S. patent application Ser. No. 15/271,346, entitled DUAL PREPAID/LOYALTY CARD FOR GAMING, filed Sep. 21, 2016, which is a continuation of U.S. patent application Ser. No. 14/033,492, entitled DUAL PREPAID/LOYALTY CARD FOR GAMING, filed Sep. 22, 2013, which claims priority to the disclosure of U.S. Provisional Patent Application Ser. No. 61/744,564, entitled "DUAL PREPAID/LOYALTY CARD FOR GAMING," filed Sep. 28, 2012, the disclosures of which are incorporated herein by reference in their entirety.

TECHNICAL FIELD

This application relates generally to financial transaction technologies, and more particularly, to customer loyalty cards for the gaming industry.

BACKGROUND

Wagering accounts, sometimes referred to as gaming accounts or player wagering accounts, are electronic ledgers that can replace the use of cash for gaming transactions by recording the deposits and withdrawals of a player who would otherwise conduct these activities with cash. Wagering accounts provide numerous benefits to both players and game operators.

For players, wagering accounts provide greater safety, sanitation, and convenience by reducing players handling of cash. Additionally, players can receive accounting reports of their transactions based on players' use of the wagering account.

For casinos, wagering accounts decrease the time casinos must spend handling and securing cash while providing the casino with more cost-effective financial accounting. Casinos also benefit from increased knowledge about consumer spending inside of the casino.

However, wagering accounts are only redeemable at a casino and do not provide convenient availability of funds for other purposes such as retail purchases. Additionally, certain jurisdictions can require different wagering accounts for specific activities such as separate accounts for live wagering, racing and sports, and for online wagering. Funds in these wagering accounts cannot be directly transferred to other wagering accounts and cannot be spent on non-wagering purchases.

A loyalty card from the casino enables a player to be compensated with bonuses and complementary rewards based upon the player's casino-related activities (i.e., gaming and/or purchases). A player's loyalty card is oftentimes conveniently linked to their wagering account(s) to enable the player to use their wager account(s) for gaming. However, as a result of the drawbacks of the wagering account(s), wagering accounts are still only used by a relatively small numbers of players.

SUMMARY

In an embodiment, the present disclosure is directed, in part, a non-transitory computer readable medium having instructions stored thereon which when executed by a processor cause the processor to transfer funds, back and forth, in real-time, upon a first player request, between a stored value account of the player and a first gaming account of the player; and transfer funds, back and forth, in real-time, upon a second player request, between the stored value account of the player and a second gaming account of the player.

In another embodiment, the present disclosure is directed, in part, a non-transitory computer readable medium having instructions stored thereon which when executed by a processor cause the processor to receive funds into a stored value account, cause the transfer funds from the stored value account to a casino gaming account in real time, and cause transfer funds from the casino gaming account to the stored value account in real time; wherein the casino gaming account is at least one of a brick and mortar wagering account; a race and sports wagering account; and an Internet gaming and wagering account.

In another embodiment, the present disclosure is directed, in part, a method for enhancing casino customer loyalty. The method comprises, comprising storing an association between a prepaid card of a consumer and a casino loyalty account of the consumer and based on the consumer using the prepaid card for financial transactions, communicating with a loyalty program processor of the casino loyalty account of the consumer to update casino loyalty account of the consumer

BRIEF DESCRIPTION OF THE DRAWINGS

It is believed that certain embodiments will be better understood from the following description taken in conjunction with the accompanying drawings in which.

DETAILED DESCRIPTION

Figure 1:
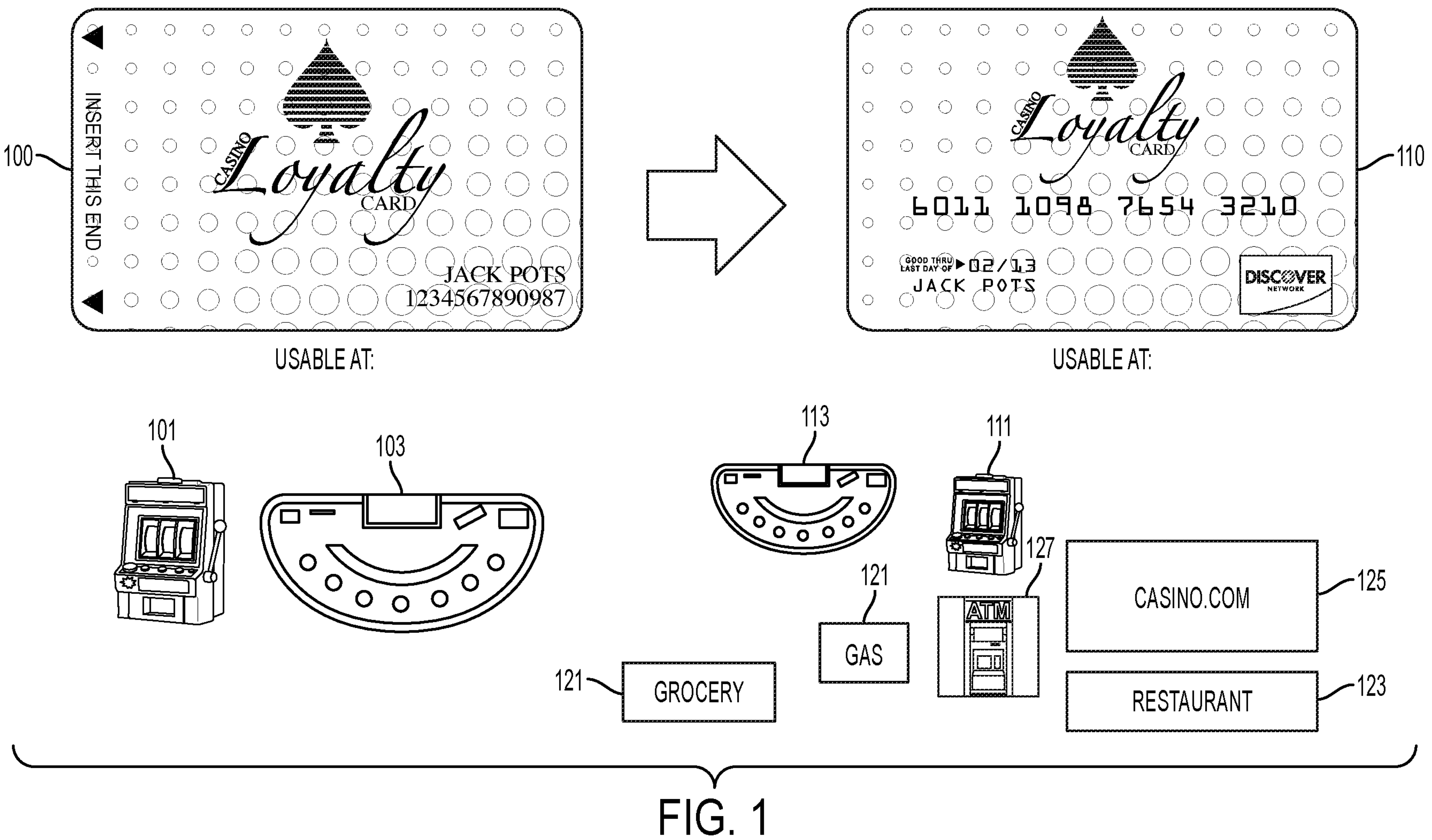
FIG. 1 is a schematic view depicting a loyalty card and a general purpose reloadable card in association with various locations for presenting at least one of the loyalty card and general purpose reloadable prepaid card.

Various non-limiting embodiments of the present disclosure will now be described to provide an overall understanding of the principles of the structure, function, and use of a loyalty card for gaming and a general purpose reloadable card and methods disclosed herein. One or more examples of these non-limiting embodiments are depicted in the accompanying drawings. Those of ordinary skill in the art will understand that systems and methods specifically described herein and depicted in the accompanying drawings are non-limiting embodiments. The features depicted or described in connection with a non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiment," "in some embodiments," "in one embodiment," "some example embodiments," "one example embodiment," or "in an embodiment" in places throughout the specification are not necessarily all referring to the same embodiment. Furthermore, the particular features, structures, or characteristics may be combined in any suitable manner in one or more embodiments.

The present disclosure is generally directed to systems and methods that associate wagering accounts with each of a general purpose reloadable (GPR) prepaid card and a loyalty card (e.g., generally referred to as a Loyalty Card Plus (LCP) system). The prepaid card can be associated with a stored value account and can be useable over an open system bankcard network, such as VISA, MASTERCARD, and DISCOVER networks. Unlike player game wagering accounts, the prepaid card can allow funds to be used at any location capable of accepting payment through the open system bankcard network such as gas stations, grocery stations, outlets, and restaurants. Other types of stored value account cards can additionally or alternatively be used.

The systems and methods disclosed herein generally allow for funds in a wagering account to be transferred out to a prepaid card, or for funds to be transferred into a wagering account from a prepaid card. A real time transfer of funds from a player game wagering account to a prepaid card can significantly increase the use of wagering accounts. In an alternative embodiment, the wagering account can be combined with a stored value account in a mobile wallet.

To transfer funds into from a wagering account to a gaming machine, a Wagering Account Transfer In (WAT In) operation may be performed. In a WAT In operation, a machine can have a meter that accumulates the total value of cashable credits electronically transferred to the machine from a wagering account by means of an external connection between the machine and a cashless wagering system.

To transfer funds from the gaming machine to a wagering account, a Wagering Account Transfer Out (WAT Out) operation may be performed. In a WAT Out operation, a gaming machine can have a meter that accumulates the total value of cashable credits to be electronically transferred from the machine to a wagering account by means of an external connection between the machine and a cashless wagering system.

In one embodiment, the LCP system can facilitate "real time" posting of funds between the wagering account(s) and the prepaid card. In some embodiments, the funds can be posted in about one minute from the conclusion of the agreement to transfer. In other embodiments, the funds can be posted in about twenty minutes. In other embodiments, real time posting means the funds are available for use within a minute. Real time posting can require establishing a closed loop communication system between the financial processor and the issuing bank of the card. Alternatively, or in addition, certain issuing banks can be used who post deposits in real time.

In some embodiments, the present disclosure can also comply with various regulator objectives. For example, in a specific embodiment, the present disclosure can provide accurate accounting of funds for tax purposes. In another embodiment, the disclosure can offer greater control of problem gaming by sensitizing and heightening the identification of, and control over, potential reckless gaming players through more extensive tracking. This additionally offers casinos the potential for compliance with regulatory requirements with a more sensitive and tailored approach. For example, players may use the accounting features to automatically block themselves at the point-of-play when certain conditions are met.

In another example, a "pause" can be provided before transferring funds into a wagering account from a stored value account (i.e., a prepaid card). This "pause" could reduce immediate access to funds thereby minimizing reckless gaming. The LCP system can be adaptable to institute any of a variety of suitable pause durations (i.e., as required in a particular jurisdiction), such as about 15 minutes, for example.

The LCP system can effectively hold funds in a convenient unified account that can be spent outside a casino. Funds in a player's wagering account(s) can be transferred to the prepaid card and then spent anywhere the prepaid card can be used.

Use of the prepaid card can facilitate automated indirect transferring of funds between first and second player wagering accounts. For example, funds can be transferred from the first wagering account to the prepaid card (i.e., the stored value account) and then from the prepaid card to the second wagering account. Automated indirect transferring of funds between wagering accounts in this manner can be less cumbersome and less time consuming than certain conventional methods. In one embodiment, funds can be transferred through an application on a mobile phone.

Referring now to FIG. 1, one embodiment of an LCP system is shown to include a loyalty card 100 and a GPR prepaid card 110.

The loyalty card 100 can be usable for gaming activities (e.g., slot machine 101 and card game 103) at the casino as well as for redemption of awarded bonuses and complementary rewards from the casino. The GPR prepaid card 110 can be associated with a stored value account. As described above, the stored value account can be a universally accepted stored value account that is usable with an open system bankcard network, such as VISA or MASTERCARD, for example, to allow use in the retail consumer world. As such, the GPR prepaid card 110 can be used for point of sale transactions, such as, for example, for retail shopping 121, restaurants 123, online shopping 125, as well as at an automated transaction machine (ATM) 127.

Figure 2:
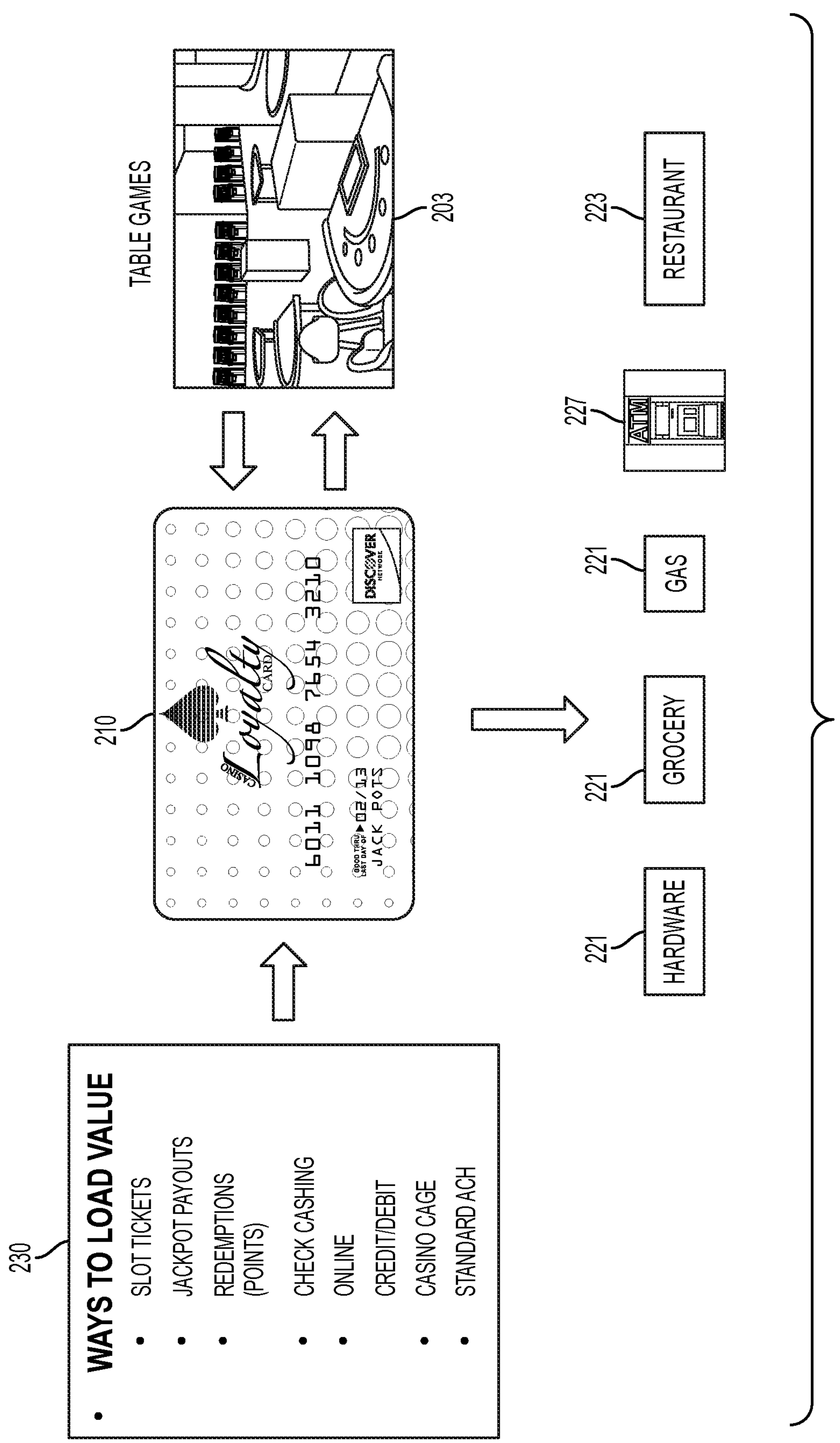
FIG. 2 is a schematic view depicting an example use of the general purpose reloadable card.

Referring now to FIG. 2, a GPR prepaid card 210 is provided that can be similar to, or the same as in many respects, the GPR prepaid card (e.g., 110) described above. The GPR prepaid card 210 can be linked to a loyalty card (not shown) by the casino. The loyalty card can be similar to, or the same as in many respects, the loyalty card (e.g., 100) described above. As illustrated in FIG. 2, the GPR prepaid card can be used at a table game 203. In such an example, a player can first supply funds to the GPR prepaid card 110 (e.g., to a stored value account) using any of a variety of physical or online payment instruments (e.g., generally identified at 230 and shown to include slot tickets, jackpot payouts, point redemptions, check cashing, online credit or debit deposits, or automated clearing house (ACH) deposits). Funds provided to the prepaid card can be directed, by the user, to a live wagering account (e.g., 502 in FIG. 5) such as through use of an online account. When the player provides the loyalty card 100 at the table game 203, funds from the live wagering account can be provided to a temporary account at the table game 203. The player's winnings and losses at the table game 203 can be credited and debited, respectively, to/from the temporary account. When the player leaves the table game 203, the funds remaining in the temporary account can be provided to the live wagering account. The player can then move the funds from the live wagering account to the GPR prepaid card 210 such that the GPR prepaid card 210 can be used at retailers 221, restaurants 223, and/or an ATM 227, for example.

Figure 3:
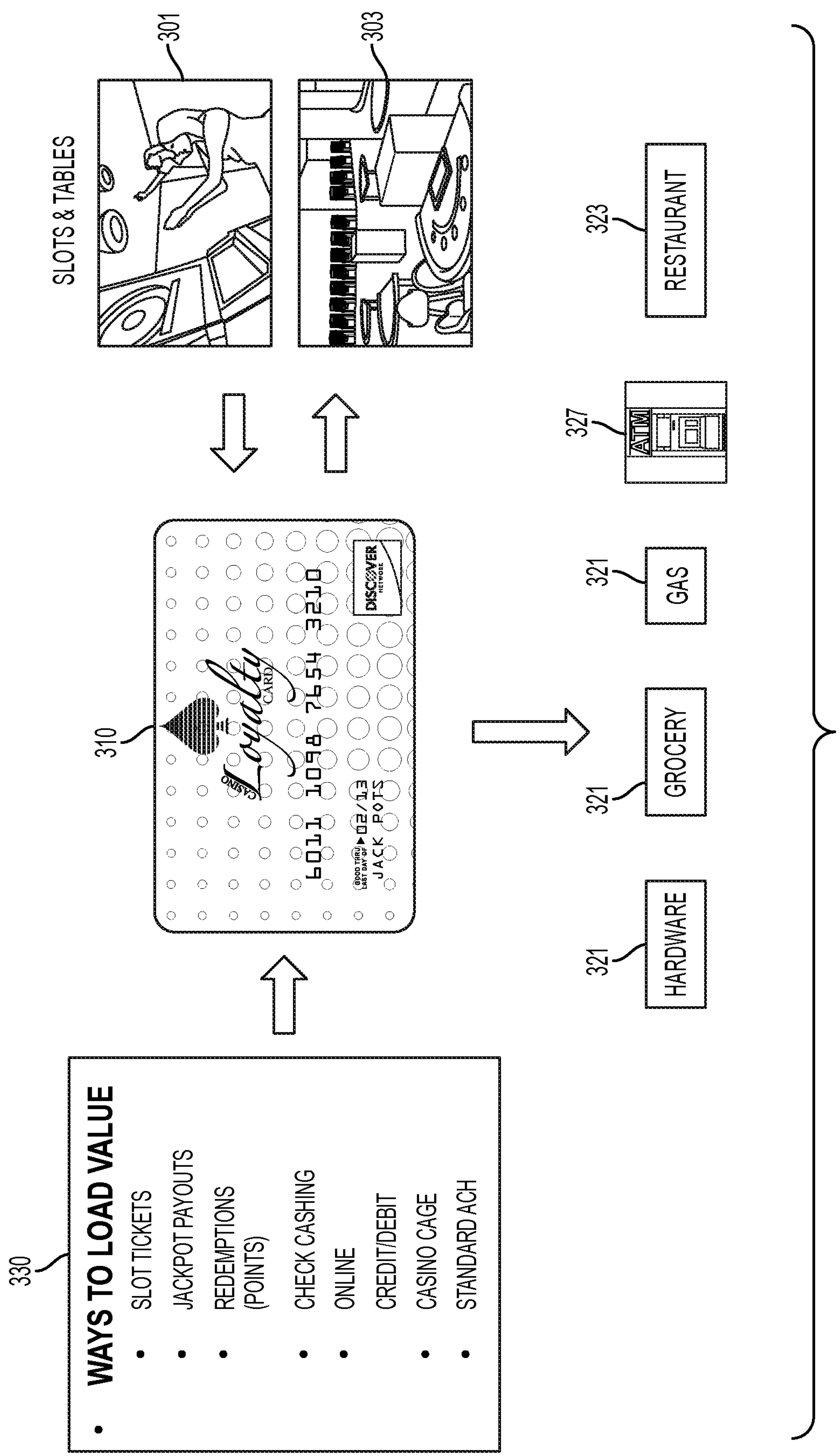
FIG. 3 is a schematic view depicting another example use of the general purpose reloadable card.

Referring now to FIG. 3, a GPR prepaid card 310 is provided that can be similar to, or the same as in many respects, the GPR prepaid card (e.g., 210) described above. For example, the GPR prepaid card 310 can be funded from a variety of different sources (e.g., 330) and can be used at retailers 321, restaurants 323, and/or an ATM 327, for example. The GPR prepaid card 310, however, is shown to be used in conjunction with a loyalty card at each of a slot machine 301 and a table game 303.

Figure 4:
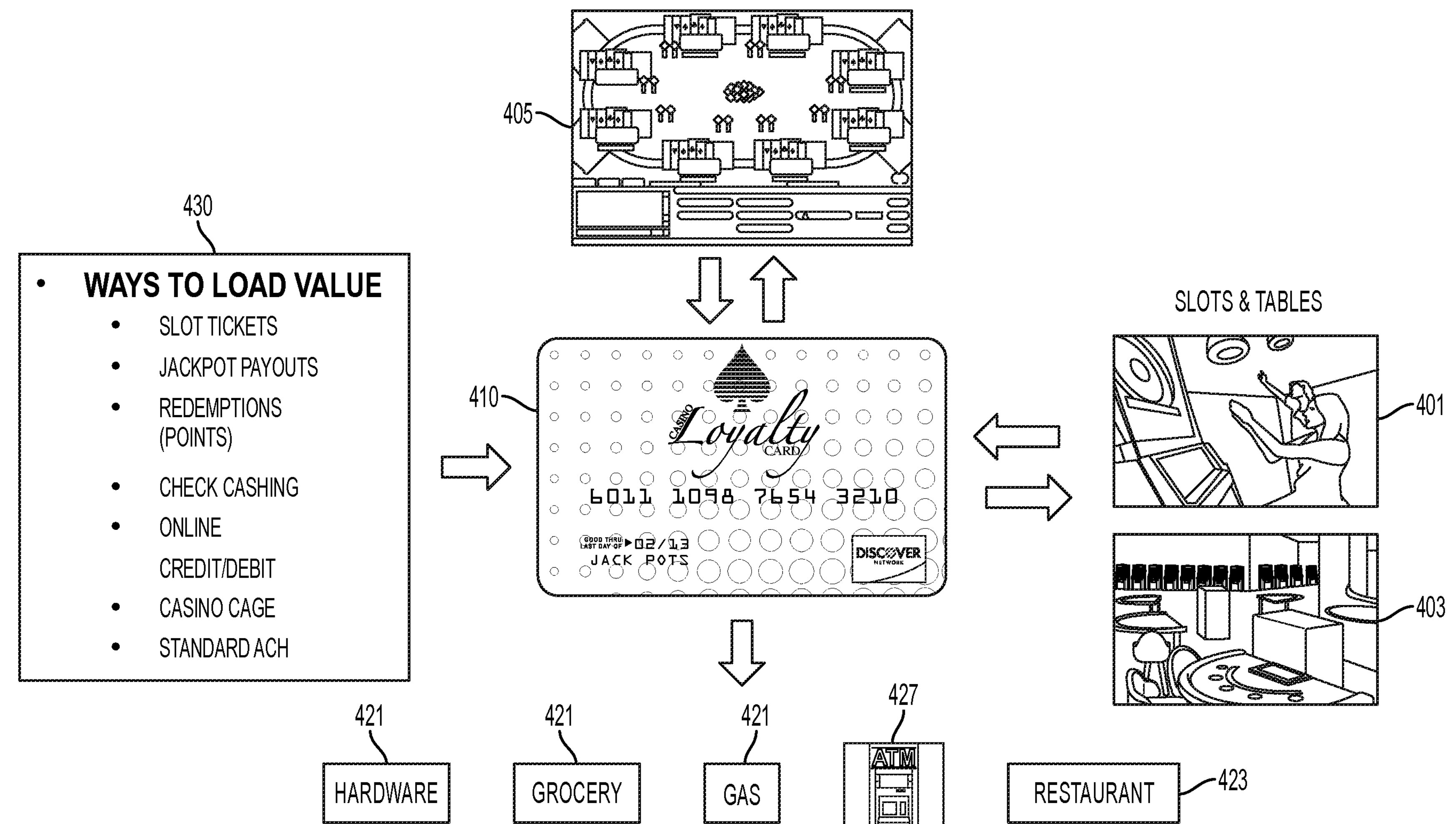
FIG. 4 is a schematic view depicting a third example use of the general purpose reloadable card.

Referring now to FIG. 4, a GPR prepaid card 410 is provided that can be similar to, or the same as in many respects, the GPR prepaid card (e.g., 210) described above. For example, the GPR prepaid card 410 can be funded from a variety of different sources (e.g., 430) and can be used at retailers 421, restaurants 423, and/or an ATM 427, for example. The GPR prepaid card 410, however, is shown to be for use at each of a slot machine 401, a table game 403, and an online game 405. In such an embodiment, funds can be directed from the GPR prepaid card 410 to an online wagering account (e.g., 504 in FIG. 5) for use in the online game 405. It will be appreciated that a GPR prepaid card can also be associated with a race and sports wagering account (e.g., 508 in FIG. 5).

Figure 5:
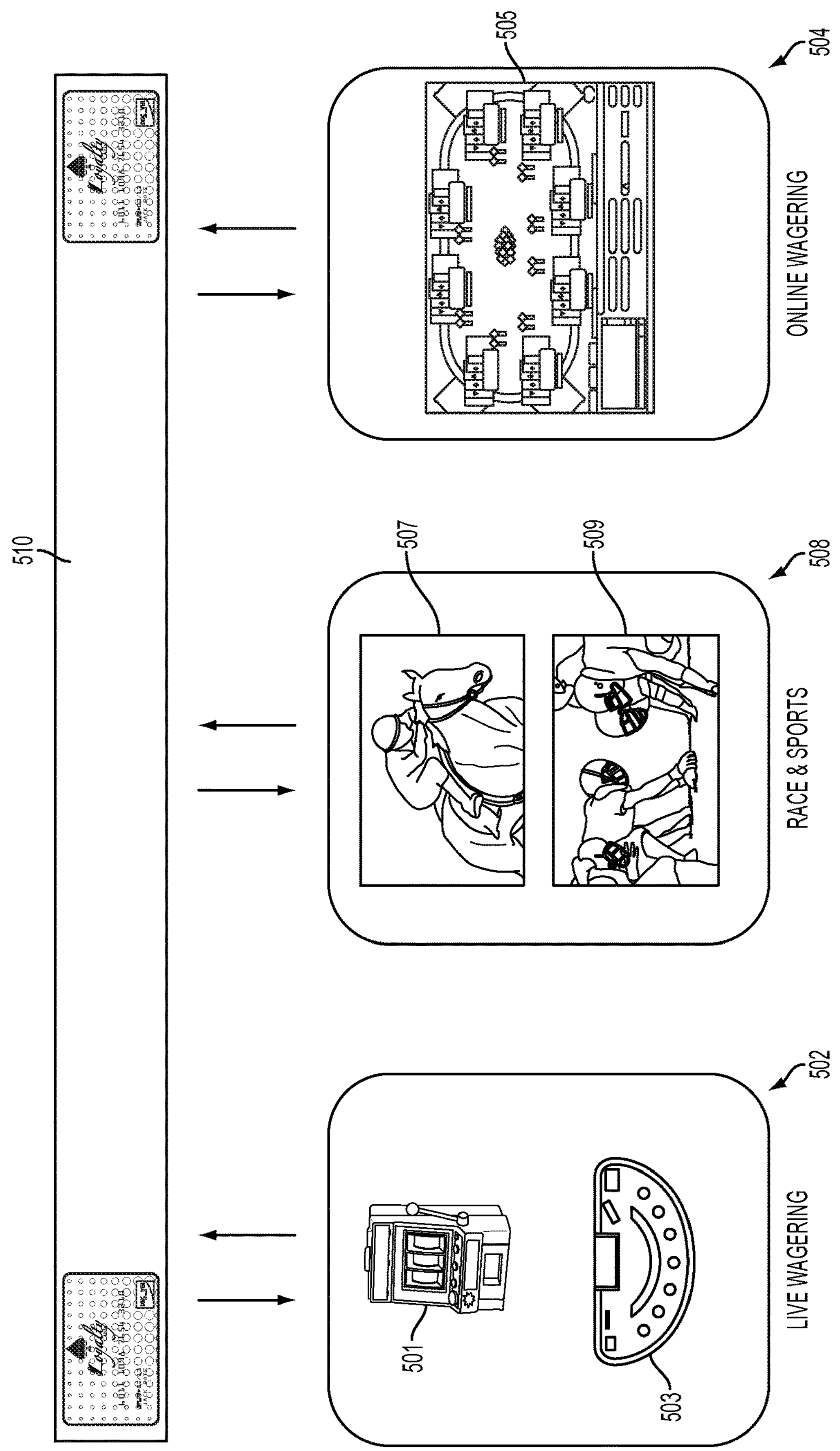
FIG. 5 is a schematic view depicting a block diagram of accounts on the general purpose reloadable card.

FIG. 5 depicts a block diagram of a GPR prepaid card 510 associated with three wagering accounts, a live wagering account 502, an online wagering account 504, and race and sports wagering account 508. Each of the wagering accounts can have independent ledgers.

A live wagering account 502 is suitable for live wagering at slots 501, card games 503, and the like. Slots 501 can directly record transactions to the live wagering account 502. A live wagering account 502 contains an electronic ledger (e.g., a temporary account) to record: (i) deposits and withdrawals of cash or cash equivalents at a designed area of accountability; (ii) deposits initiated with a debit instrument; (iii) wagering account transfers to and from gaming devices; and (iv) wagering account adjustments.

An online wagering account 504 is suitable for wagering in online games 505. An online wagering account 504 contains an electronic ledger to record: (i) deposits; (ii) withdrawals; (iii) amounts wagered; (iv) amounts paid on winning wagers; (v) service or other transaction-related charges authorized by the patron; and (vi) adjustments to the account.

A race and sports wagering account 508 is suitable for wagering on sports 509, nonpari-mutuel races 507, and the like. A race and sports wagering account 508 contains an electronic ledger to record: (i) deposits; (ii) withdrawals; (iii) amounts wagered; (iv) amounts paid on winning wagers; (v) amounts paid for horse racing-related services or merchandise; (vi) service or other transaction-related charges authorized by the patron; and (vii) adjustments to the account.

In such an embodiment, a player using the LCP system can transfer funds between a stored value account associated with the GPR prepaid card 510 and the wagering accounts 502, 504, and 508. For example, a user can transfer money from race and sports wagering account 508 to the stored value account, and then transfer the money to the online wagering account 504 for online use. Alternatively, a user may transfer money from any of the wagering accounts 502, 504, 508 to the stored value account to facilitate use of the GPR prepaid card 510 at a retail store.

It will be appreciated that although the LCP system is described above as a two card system, an LCP system can alternatively be provided as a unitary card system. In such an arrangement, the loyalty card functionality and the prepaid card functionality can be incorporated into one card with the loyalty card functionality and the prepaid card functionality still being associated with different accounts (e.g., a loyalty account and a stored value account, respectively).

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A system, comprising:

a first physical card and a second physical card separate from the first physical card, wherein the first physical card is a general purpose reloadable (GPR) prepaid card issued by an issuing bank, wherein the GPR prepaid card is associated with a stored value account holding funds of a player, wherein the funds of the player are accessible through the use of GPR prepaid card at any merchant associated with an open system bankcard network affiliated with the GPR prepaid card, wherein the second physical card is a loyalty card, wherein the loyalty card is associated with a casino loyalty account of the player; and one or more computing devices comprising instructions stored in memory which when executed by one or more processors of the one or more computing devices, cause the one or more computing devices to:

associate the GPR prepaid card with the loyalty card; and subsequent to the player providing the loyalty card to a gaming machine and based on the association between the loyalty card and the GPR prepaid card, transferring funds, back and forth, in real-time via closed loop communications with the issuing bank, upon a player request, between the stored value account associated with the GPR prepaid card and a wagering account of the player, wherein funds of the wagering account are usable for wagering at the gaming machine, and wherein the GPR prepaid card is not provided to the gaming machine.

2. The system of claim 1, wherein:

the wagering account comprises any of a brick and mortar wagering account, a race and sports wagering account, and an Internet gaming and wagering account.

3. The system of claim 1, wherein the instructions further cause the one or more computing devices to:

track gaming activity of the player as a function of at least funds expended the wagering account.

4. The system of claim 3, wherein the instructions further cause the one or more computing devices to:

increase a value in the wagering account as a function of at least the tracked gaming activity.

5. The system of claim 1, wherein the instructions further cause the one or more computing devices to:

institute a pause between receiving the player request to transfer funds between the stored value account associated with the GPR prepaid card and the wagering account of the player and a causing of the funds to be available in the wagering account for use for gaming by the player.

6. The system of claim 1, wherein the instructions further cause the one or more computing devices to:

generate an accounting report for the wagering account.

7. The system of claim 1, wherein the casino loyalty account is maintained by a loyalty program processor.

8. The system of claim 7, further comprising the loyalty program processor.

9. The system of claim 1, wherein the closed loop communications with the issuing bank do not use an ATM network.

10. A computer-based method, the method performed by one or more computing devices comprising instructions stored in memory, which when executed by one or more processors of the one or more computing devices, cause the one or more computing devices to perform the method comprising:

associating a player with a two card system comprising a first physical card and a second physical card, wherein the first physical card is a general purpose reloadable (GPR) prepaid card issued by an issuing bank and the second physical card is a loyalty card, wherein the GPR prepaid card is associated with a stored value account holding funds of the player that are usable through an open system bankcard network, the loyalty card is associated with a casino loyalty account; and subsequent to the player providing the loyalty card to a gaming machine and based on the association between the loyalty card and the GPR prepaid card, transferring funds, back and forth, in real-time via closed loop communications with the issuing bank, upon a player request, between the stored value account associated with the GPR prepaid card and a wagering account of the player, wherein funds of the wagering account are usable for wagering at the gaming machine, and wherein the GPR prepaid card is not provided to the gaming machine.

11. The computer-based method of claim 10, wherein the wagering account comprises any of a brick and mortar wagering account, a race and sports wagering account, and an Internet gaming and wagering account.

12. The computer-based method of claim 10, wherein the instructions further cause the one or more computing devices to perform the method comprising:

tracking gaming activity of the player as a function of at least funds expended the wagering account.

13. The computer-based method of claim 12, wherein the instructions further cause the one or more computing devices to perform the method comprising:

increasing a value in the wagering account as a function of at least the tracked gaming activity.

14. The computer-based method of claim 10, wherein the instructions further cause the one or more computing devices to perform the method comprising:

instituting a pause between receiving the player request to transfer funds between the stored value account associated with the GPR prepaid card and the wagering account of the player and a causing of the funds to be available in the wagering account for use for gaming by the player.

15. The computer-based method of claim 10, wherein the instructions further cause the one or more computing devices to perform the method comprising:

generating an accounting report for the wagering account.

16. A computer-based method, the method performed by one or more computing devices comprising instructions stored in memory which when executed by one or more processors of the one or more computing devices, cause the one or more computing devices to perform the method comprising:

associating a player with a two card system comprising a first physical card and a second physical card, wherein the first physical card is a general purpose reloadable (GPR) prepaid card issued by an issuing bank and the second physical card is a loyalty card, wherein the GPR prepaid card is associated with a stored value account holding funds of the player that are usable through an open system bankcard network, the loyalty card is associated with a casino loyalty account;

receiving funds into the stored value account associated with the GPR prepaid card;

subsequent to the player providing the loyalty card to a gaming machine and based on the association between the loyalty card and the GPR prepaid card, causing the real time transfer of funds from the stored value account associated with the GPR prepaid card to a casino wagering account associated with the gaming machine via closed loop communications with the issuing bank, wherein the GPR prepaid card is not provided to the gaming machine; and subsequent to the player placing a wager, causing the real time transfer of funds from the casino wagering account to the stored value account via closed loop communications with the issuing bank; wherein the casino wagering account is any of a brick and mortar wagering account; a race and sports wagering account; and an Internet gaming and wagering account.

17. The computer-based method of claim 16, wherein the funds are received into the stored value account from a value source.

18. The computer-based method of claim 17, wherein the value source is one or more of a slot ticket, a jackpot payout, and a point redemption.

19. The computer-based method of claim 17, wherein the value source is one or more of an automated clearing house transaction, a transfer from a debit account, and a transfer from a credit account.

20. The computer-based method of claim 16, wherein the casino loyalty account is maintained by a loyalty program processor.

* * * * *